(12) United States Patent
Lindström

(10) Patent No.: US 8,519,563 B2
(45) Date of Patent: Aug. 27, 2013

(54) ELECTRICAL SYSTEM FOR A MOTOR VEHICLE AND METHOD FOR CONTROL OF A STARTER MOTOR AND A BATTERY ISOLATOR IN SUCH AN ELECTRICAL SYSTEM

(75) Inventor: Johan Lindström, Nyköping (SE)

(73) Assignee: Scania CV AB (Publ) (SE)

( * ) Notice: Subject to any disclaimer, the term of this patent is extended or adjusted under 35 U.S.C. 154(b) by 320 days.

(21) Appl. No.: 12/866,065

(22) PCT Filed: Jan. 19, 2009

(86) PCT No.: PCT/SE2009/050048
§ 371 (c)(1),
(2), (4) Date: Sep. 1, 2010

(87) PCT Pub. No.: WO2009/099383
PCT Pub. Date: Aug. 13, 2009

(65) Prior Publication Data
US 2011/0001354 A1   Jan. 6, 2011

(30) Foreign Application Priority Data
Feb. 4, 2008   (SE) ........................................ 0800255

(51) Int. Cl.
*B60R 22/00* (2006.01)
(52) U.S. Cl.
USPC ........................................................ 307/10.6
(58) Field of Classification Search
USPC ............... 307/10.1, 10.6, 10.7; 320/103, 104
See application file for complete search history.

(56) References Cited

U.S. PATENT DOCUMENTS

| 5,789,900 A | 8/1998 | Hasegawa et al. |
| 5,818,115 A | 10/1998 | Nagao ............................. 290/31 |

(Continued)

FOREIGN PATENT DOCUMENTS

| JP | 5-99104 | 4/1993 |
| JP | 05-099104 | 4/1993 |

(Continued)

OTHER PUBLICATIONS

International Search Report dated May 12, 2009, issued in corresponding international application No. PCT/SE2009/050048.

(Continued)

*Primary Examiner* — Jared Fureman
*Assistant Examiner* — Duc M Pham
(74) *Attorney, Agent, or Firm* — Ostrolenk Faber LLP

(57) ABSTRACT

An electric system for a motor vehicle and method for control of a starter motor (10) and a battery isolator (11) in such an electrical system. A consumer battery set and a starting battery set (6) are connected in parallel. The battery isolator is switchable between an off position in which the starting battery set is electrically disconnected from the starter motor, and an on position in which the starting battery set is electrically connected to the starter motor. An electronic control device (12), upon receiving a starting signal, causes the battery isolator to assume the on position, and thereafter causes the starter motor to start, in order thereby to ensure that the battery isolator is in the on position before the starter motor is started. For switching off the starter motor, the battery isolator is only allowed to be switched from on position to off position after the starter motor has been switched off, in order thereby to ensure that the starter motor is switched off before the battery isolator is caused to adopt the off position.

14 Claims, 2 Drawing Sheets

(56) References Cited

U.S. PATENT DOCUMENTS

| | | | | |
|---|---|---|---|---|
| 5,834,854 | A * | 11/1998 | Williams | 307/10.6 |
| 5,977,652 | A * | 11/1999 | Frey et al. | 307/10.1 |
| 6,057,666 | A | 5/2000 | Dougherty et al. | |
| 6,229,279 | B1 * | 5/2001 | Dierker | 320/104 |
| 6,232,674 | B1 * | 5/2001 | Frey et al. | 307/10.1 |
| 6,275,001 | B1 * | 8/2001 | Dierker | 320/103 |
| 6,304,054 | B1 * | 10/2001 | Granberg et al. | 320/104 |
| 6,417,579 | B1 * | 7/2002 | Lehnst et al. | 307/10.7 |
| 6,545,445 | B1 | 4/2003 | McDermott et al. | |
| 6,765,312 | B1 | 7/2004 | Urlass et al. | |
| 7,061,138 | B2 * | 6/2006 | Richter et al. | 307/10.7 |
| 7,362,005 | B2 * | 4/2008 | Leblanc | 307/10.1 |
| 2003/0205937 | A1 * | 11/2003 | Koos et al. | 307/10.6 |
| 2007/0170778 | A1 * | 7/2007 | Yamaguchi | 307/10.1 |
| 2008/0252148 | A1 * | 10/2008 | Pursifull | 307/81 |

FOREIGN PATENT DOCUMENTS

| | | |
|---|---|---|
| JP | 9-88778 | 3/1997 |
| JP | 2002-115634 | 4/2002 |
| JP | 2006-194144 | 7/2006 |
| JP | 3829379 | 7/2006 |
| WO | WO 2005/045240 A1 | 5/2005 |
| WO | WO 2006/058866 A1 | 6/2006 |

OTHER PUBLICATIONS

English translation of the Japanese Office Action mailed Oct. 2, 2012.

Chinese Office Action, dated Apr. 11, 2013, issued in corresponding Chinese Patent Application No. 200980104156.1 Total 12 pages, including English Translation.

* cited by examiner

ELECTRICAL SYSTEM FOR A MOTOR VEHICLE AND METHOD FOR CONTROL OF A STARTER MOTOR AND A BATTERY ISOLATOR IN SUCH AN ELECTRICAL SYSTEM

CROSS REFERENCE TO RELATED APPLICATION

The present application is a 35 U.S.C. §§371 national phase conversion of PCT/SE2009/050048 filed Jan. 19, 2009, which claims priority of Swedish Application No. 0800255-2, filed Feb. 4, 2008, the disclosure of which is incorporated by reference herein. The International Application was published in the English Language.

FIELD OF THE INVENTION AND PRIOR ART

The present invention relates to an electrical system for a motor vehicle and a method for control of a starter motor and a battery isolator in an electrical system of a motor vehicle. The invention relates also to a computer program product comprising computer program codes for implementing a method according to the invention, and an electronic control unit.

A motor vehicle powered by a combustion engine is usually provided with an electrically powered starter motor for starting the combustion engine. When the driver of the motor vehicle activates a starting arrangement, e.g. by turning an ignition key or by pressing in a starting button, a rotor of the starter motor is put into engagement with the combustion engine's crank-shaft and the starter motor is supplied with electric current from a battery to cause the starter motor to rotate the combustion engine's crankshaft and thereby make it possible for the combustion engine to start. When the combustion engine has started, the starter motor is switched off and disconnected from the combustion engine.

A known practice from, for example, U.S. Pat. No. 6,057,666 A, U.S. Pat. No. 6,229,279 B1, U.S. Pat. No. 6,275,001 B1, U.S. Pat. No. 6,545,445 B1 and U.S. Pat. No. 6,765,312 B1 is for an electrical system of a combustion engine with starter motor to be provided with a first battery set comprising one or more batteries for supplying electric current to various electrical consumers of the motor vehicle, and a second battery set comprising one or more batteries which are particularly intended to supply electric current to the starter motor. In this description and the claims set out after it, the expression "consumer battery set" means such a first battery set, and the expression "starting battery set" means such a second battery set. The respective batteries which form part of the consumer battery set are here called consumer batteries, while the respective batteries which form part of the starting battery set are here called starting batteries.

By suitable control of an electrical system provided with a consumer battery set and a starting battery set it is possible to ensure that the starting battery set is always kept charged in order to be able to provide electric current for starting the motor vehicle. The use of a consumer battery set and a separate starting battery set also makes it possible to optimise the batteries of the respective battery sets according to their intended functions.

OBJECT OF THE INVENTION

The object of the present invention is to propose a novel and advantageous way of regulating an electrical system for a motor vehicle and method for control of a starter motor and a battery isolator in such an electrical system. A consumer battery set and a starting battery set are connected in parallel. The battery isolator is switchable between an off position, in which the starting battery set is electrically disconnected from the starter motor, and an on position, in which the starting battery set is electrically connected to the starter motor. An electronic control device, upon receiving a starting signal, causes the battery isolator to assume the on position, and thereafter causes the starter motor to start, in order thereby to ensure that the battery isolator is in the on position before the starter motor is started. For switching off the starter motor, the battery isolator is only allowed to be switched from on position to off position after the starter motor has been switched off, to ensure that the starter motor is switched off before the battery isolator is caused to adopt the off position.

SUMMARY OF THE INVENTION

According to the present invention, said object is achieved by means of an electrical system having the features indicated below and a method having the features defined below.

According to the invention a starter motor forming part of the electrical system and a battery isolator forming part of the electrical system are controlled by means of an electronic control device in such a way:
  that for starting the starter motor the battery isolator is always placed in the on position for supplying electric current to the starter motor from the starting battery set before the starter motor is started, and
  that the starter motor is always switched off before the battery isolator is allowed to be switched from on position to off position to disconnect the starting battery set from the starter motor.

It is thereby ensured that the battery isolator is always in the on position and the starting battery set is thus electrically connected to the starter motor before the starter motor is started, and that the starter motor is always switched off before the battery isolator is switched from the on position to the off position to disconnect the starting battery set from the starter motor.

A battery isolator of a standard type is usually dimensioned to break and make electric currents of up to about 300 A, which is sufficient for the commonest electrical consumers of a motor vehicle other than the starter motor. An electric current of about 1200-1500 A usually passes through the starter motor at the moment when the starter motor is started, and the starter motor in operation usually draws an electric current which averages about 600 A. The solution according to the invention makes it possible to use a relatively inexpensive battery isolator of a standard type to connect a starting battery set to a starter motor of an electrical system of the type here concerned, since this battery isolator has no need to break or make any electric current at the same time as the starter motor is being started or is in operation. The solution according to the invention is also a simple and cost-effective way of connecting a separate starting battery set in an existing electrical system of a motor vehicle, since it entails no major restructuring of the existing electrical system.

According to an embodiment of the invention, the control device is adapted, after switching off of the starter motor, to causing the battery isolator to assume the off position and thereby disconnect the starting battery set from a generator which forms part of the electrical system when it is determined that the starting battery/batteries of the starting battery set has/have been charged to a given extent under the action of the generator. Overcharging of the starting batteries is thus prevented, which contributes to longer service life and lower water consumption of the starting batteries.

Other advantageous features of the electrical system and the method according to the invention are indicated by the description set out below.

The invention relates also to a computer program product having the features defined below and an electronic control unit having the features defined below.

BRIEF DESCRIPTION OF THE DRAWINGS

The invention is described in more detail below on the basis of embodiment examples with reference to the attached drawings, in which.

DETAILED DESCRIPTION OF PREFERRED EMBODIMENTS

Figure 1:
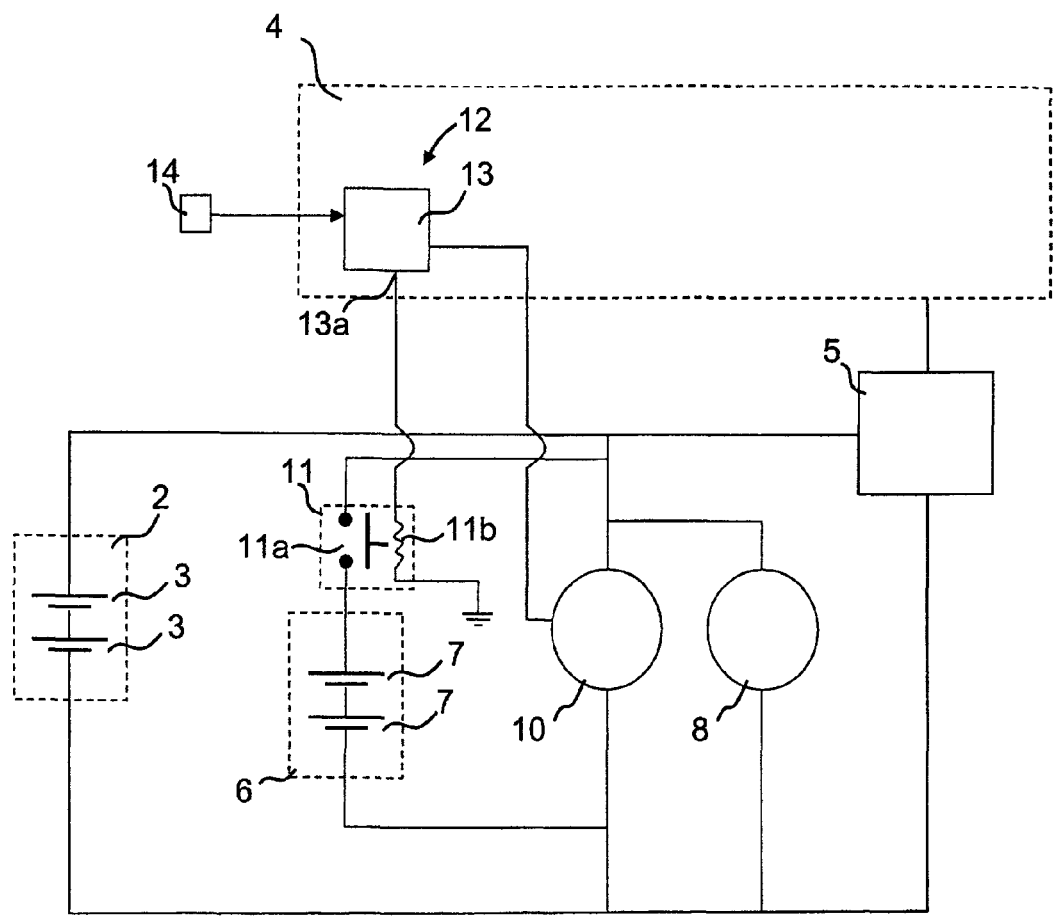
FIG. 1 depicts a schematic skeleton diagram of an electrical system according to an embodiment of the present invention.

FIG. 1 illustrates schematically an embodiment of an electrical system 1 according to the invention for a motor vehicle which is provided with a combustion engine (not depicted). The electrical system 1 according to the invention comprises a first battery set 2, hereinafter called the consumer battery set, comprising one or more batteries 3, hereinafter called consumer batteries, for supplying electric current to various electrical consumers of the vehicle. These electrical consumers are schematically and jointly represented by the block 4 in FIG. 1 and comprise for example various control units, lighting devices, refrigerators and sundry other components of the vehicle which are powered by electric current. In the example illustrated, the consumer battery set 2 is connected to the electrical consumers 4 via an electrical central unit 5 which comprises fuses, relays etc.

The electrical system 1 further comprises a second battery set 6, hereinafter called the starting battery set, comprising one or more batteries 7, hereinafter called starting batteries, for supplying electric current to a starter motor 10 of the vehicle. The starting battery set 6 is connected in parallel with the consumer battery set 2. In the example illustrated, the consumer battery set 2 comprises two consumer batteries 3 connected in series, and the starting battery set 6 comprises two starting batteries 7 connected in series. The number of batteries in the respective battery sets 2, 6 may nevertheless be more or fewer than two if this is found advantageous.

The consumer battery set 2 and the starting battery set 6 are connected to a generator 8 of the vehicle, which generator is driven by the vehicle's combustion engine in order, when the combustion engine is in operation, to generate electric current for charging the batteries 3, 7 of the consumer battery set and the starting battery set and for powering the vehicle's electrical consumers 4. The vehicle might also comprise more than one such generator.

The starter motor 10 may be powered by electric current both from the consumer battery set 2 and from the starting battery set 6. To make controlled connection and disconnection of the starting battery set 6 possible, the electrical system 1 comprises a battery isolator 11 which is switchable between an off position in which the battery isolator 11 is adapted to keeping the starting battery set 6 electrically disconnected from the starter motor 10, and an on position in which the battery isolator 11 is adapted to keeping the starting battery set 6 electrically connected to the starter motor 10 for supply of electric current to the starter motor from the starting battery set. The starting battery set 6 is also electrically connected to the consumer battery set 2 when the battery isolator 11 is in the on position, and disconnected from the consumer battery set 2 when the battery isolator 11 is in the off position. The battery isolator 11 is connected in series with the starting battery set 6 and connected in parallel with the consumer battery set 2 and therefore does not act upon the connection between the consumer battery set 2 and the electrical consumers 4, nor upon the connection between the consumer battery set 2 and the starter motor 10.

The battery isolator 11 is also adapted:
in the on position, to keeping the starting battery set 6 electrically connected to the generator 8 in order thereby to allow supply of electric current to the starting battery set 6 from the generator for charging the starting batteries 7 of the starting battery set, and
in the off position, to keeping the starting battery set 6 electrically disconnected from the generator 8.

The battery isolator 11 and the starter motor 10 are controlled by means of an electronic control device 12 which in the example illustrated comprises an electronic control unit 13 adapted to controlling both the battery isolator 11 and the starter motor 10. Alternatively, the control device 12 might comprise two separate but mutually communicating electronic control units, one of them controlling the switching of the battery isolator, the other controlling the switching of the starter motor.

The battery isolator 11 takes preferably the form of a relay which in a conventional manner comprises a circuit breaker 11a and an electromagnet 11b, which circuit breaker 11a under the action of the electromagnet 11b closes when electric current is supplied via the electromagnet and reverts to the open position when the supply of current via the electromagnet ceases. In the example illustrated in FIG. 1, the battery isolator 11 is switched from off position to on position by energisation of an output 13a of the control unit 13, which output is connected to the battery isolator's electromagnet 11b. The battery isolator 11 is thereafter kept in the on position so long as the output 13a remains energised, and is switched to the off position when the energisation of the output 13a ceases. The battery isolator might of course also be of some other type than that illustrated in FIG. 1.

The control device 12 is with advantage adapted, after the starter motor 10 has been switched off, to causing the battery isolator 11 to adopt the off position when the control device 12 has determined, or received information, that the starting batteries 7 of the starting battery set have been charged to a given extent. The control device 12 may for example be adapted to causing the battery isolator 11 to assume the off position when the starting batteries 7 have been charged for a given charging time. This charging time may for example run from when, after starting of the vehicle's combustion engine has taken place, there is sufficient voltage in the electrical system 1 to effect charging of the starting batteries 7, i.e. when the control device 12 has determined, or received information, that the voltage level of the electrical system has risen to the charge voltage prescribed for the starting batteries. The desired charging level of the starting batteries 7 may also be determined in some other conventional manner.

The control device 12 is with advantage adapted, upon receiving a starting signal from the starting means 14, to causing the starter motor 10 to start with a given time delay after the control device has caused the battery isolator 11 to assume the on position.

Upon starting of the starter motor 10, a rotor of the starter motor is put into engagement with the crankshaft of the vehicle's combustion engine while at the same time a contact in the starter motor is closed so that the starter motor can be supplied with electric current. The battery isolator 11 has therefore to be switched to the on position before the contact in the starter motor 10 closes. When the contact in the starter motor 10 has closed, the starter motor can be supplied with electric current from the electrical system's battery sets 2, 6, whereupon the starter motor will rotate the combustion engine's crankshaft and thereby make it possible for the combustion engine to start. As the starting battery set 6 is connected in parallel with the consumer battery set 2, whichever battery set has the larger power reserve will provide the larger supply of current to the starter motor 10. In the normal case, the starting batteries 7 of the starting battery set 6 should be fully charged or at least nearly fully charged and should thus have a large power reserve when the vehicle is started, which is ensured by the starting battery set being disconnected by the battery isolator 11 from the vehicle's electrical consumers 4 and from the consumer battery set 2 when the starting batteries 7 of the starting battery set have been charged to a desired extent after a starting of the vehicle's combustion engine.

When it has in a conventional manner been detected that the combustion engine has started, e.g. by monitoring the speed of the combustion engine, the control device 12 is adapted to effecting a switching off of the starter motor 10, whereupon the aforesaid contact in the starter motor 10 will open and the starter motor's rotor will be disconnected from the combustion engine's crankshaft. The control device 12 is adapted to only allowing the battery isolator 11 to be switched from on position to off position after the control device 12 has effected switching off of the starter motor 10, thereby ensuring that the starter motor 10 is switched off before the battery isolator 11 is caused to assume the off position.

The control device 12 is with advantage adapted, after the starter motor 10 has been switched off, to causing the battery isolator 11 to adopt the off position when the control device 12 has determined, or received information, that the starting batteries 7 of the starting battery set have been charged to a given extent. The control device 12 may for example be adapted to causing the battery isolator 11 to assume the off position when the starting batteries 7 have been charged for a given charging time. This charging time may for example run from when, after starting of the vehicle's combustion engine has taken place, there is sufficient voltage in the electrical system 1 to effect charging of the starting batteries 7, i.e. when the control device 12 has determined, or receiving information, that the voltage level of the electrical system has risen to the charge voltage prescribed for the starting batteries. The desired charging level of the starting batteries 7 may also be determined in some other conventional manner.

To avoid a discharge of the starting batteries 7, the control device 12 is with advantage adapted, after the starter motor 10 has been switched off and before the control device 12 has determined, or received information, that the starting batteries 7 have been charged to the given extent, to causing the battery isolator 11 to assume the off position when the control device 12 has determined, or received information, that the voltage of the electrical system 1 is lower than the charge voltage prescribed for the starting batteries 7, and to thereafter causing the battery isolator 11 to assume the on position when the control device 12 has determined, or received information, that the voltage of the electrical system 1 has risen to said charge voltage. In this case, only the periods of time during which the battery isolator 11 has been in the on position count as part of the aforesaid charging time.

Figure 3:
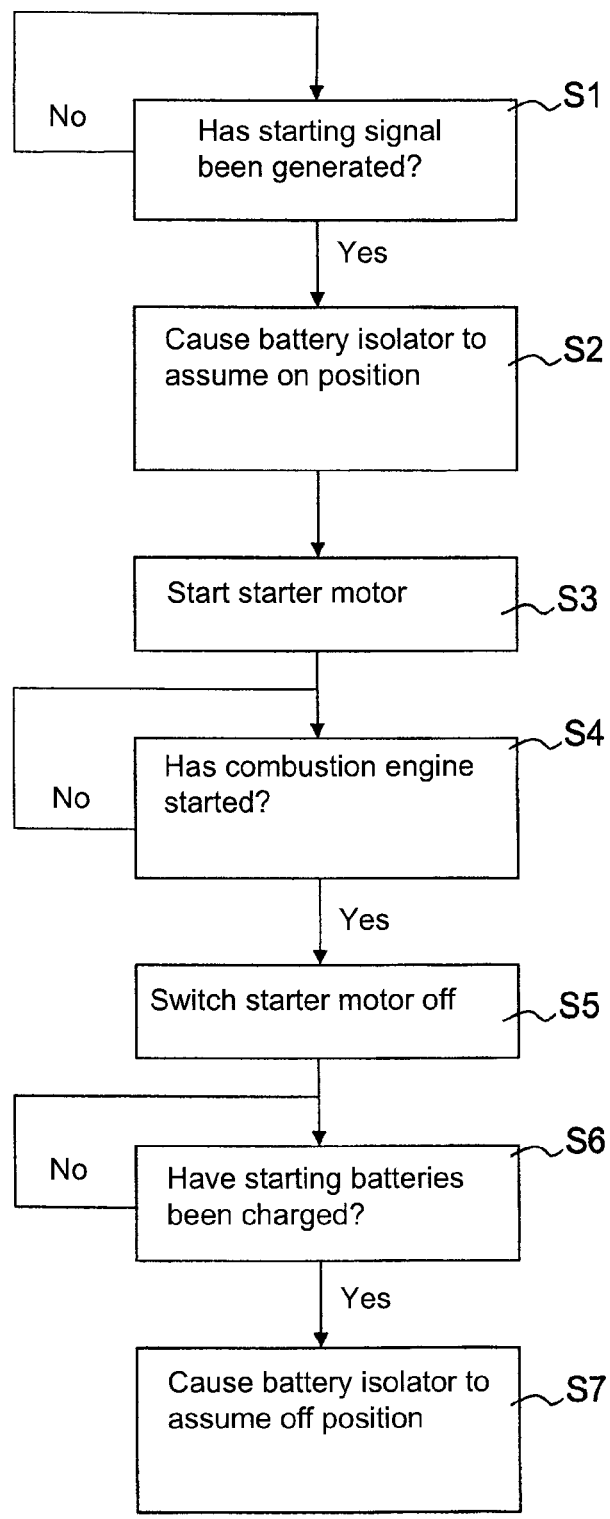
FIG. 3 depicts a flowchart illustrating a method according to an embodiment of the invention.

FIG. 3 depicts a flowchart illustrating a embodiment of a method according to the present invention for control of a starter motor 10 and a battery isolator 11 in an electrical system 1 of the type illustrated in FIG. 1. At a first step S1, the electrical system's control device 12 determines whether a starting signal has been generated. If such is the case, the control device 12, at a second step S2, causes the battery isolator 11 to assume the on position so that the electrical system's starting battery set 6 is connected to the starter motor 10. Thereafter, at a third step S3, the control device 12 causes the starter motor 10 to start. At a fourth step S4, the control device 12 determines whether the vehicle's combustion engine has started. If such is the case, the control device 12, at a fifth step S5, causes switching off of the starter motor 10. At a sixth step S6 the control device 12 determines whether the starting battery set's starting batteries 7 have been charged to a given extent. If such is the case, the control device 12, at a seventh step S7, causes the battery isolator 11 to assume the off position.

Computer program codes for implementing a method according to the invention are with advantage included in a computer program which can be read into an internal memory of a computer, such as the internal memory of an electronic control unit of a motor vehicle. Such a computer program is with advantage provided via a computer program product comprising a data storage medium readable by an electronic control unit, which data storage medium has the computer program stored on it. Said data storage medium is for example an optical data storage medium in the form of a CD ROM disc, a DVD disc etc., a magnetic data storage medium in the form of a hard disc, a diskette, a cassette tape etc., or a memory of the ROM, PROM, EPROM or EEPROM type or a flash memory.

A computer program product according to an embodiment of the invention comprises computer program codes for causing an electronic control device in an electrical system of the type illustrated in FIG. 1 upon receiving a starting signal from the starting means, to cause the battery isolator to assume the on position and thereafter cause the starter motor to start in order thereby to ensure that the battery isolator is in the on position before the starter motor is started, and for switching off of the starter motor, to cause the starter motor to be switched off, and only thereafter to allow the battery isolator to be switched from on position to off position in order thereby to ensure that the starter motor is switched off before the battery isolator is caused to assume the off position.

Figure 2:
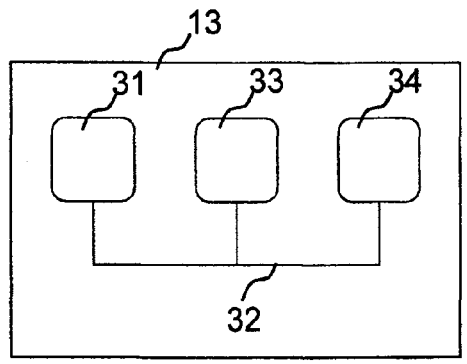
FIG. 2 depicts a skeleton diagram of an electronic control unit for implementing a method according to the invention.

FIG. 2 illustrates very schematically an electronic control unit 13 comprising an execution means 31, such as a central processor unit (CPU), for execution of computer software. The execution means 31 communicates with a memory 33, e.g. of the RAM type, via a databus 32. The control unit 13 comprises also a data storage medium 34, e.g. in the form of a memory of the ROM, PROM, EPROM, EEPROM type or a flash memory. The execution means 31 communicates with the data storage medium 34 via the databus 32. A computer program comprising computer program codes for implementing a method according to the invention, e.g. in accordance with the embodiment illustrated in FIG. 3, is stored on the data storage medium 34.

This invention is intended to be used in a motor vehicle, e.g. a passenger car, a bus, a tractor unit or a truck.

The invention is of course in no way limited to the embodiments described above, since a plurality of possibilities for modifications thereof are likely to be obvious to a specialist in the field without thereby having to depart from the basic concept of the invention as defined in the attached claims.

The invention claimed is:

1. An electrical system for a motor vehicle, the electrical system comprising:
    a consumer battery set comprising one or more consumer batteries for supplying electric current to various electrical consumers of the motor vehicle,
    a starting battery set comprising one or more starting batteries and connected in parallel with the consumer battery set,
    a starter motor for starting the engine,
    a battery isolator in an electrical circuit with the starting battery set, the isolator being switchable between an off position thereof in which the battery isolator is configured to keep the starting battery set electrically disconnected from the starter motor, and an on position thereof in which the battery isolator is configured to keep the starting battery set electrically connected to the starter motor for supply of electrical current to the starter motor from the starting battery set, and
    a starter operable for generating a starting signal for starting the starter motor,
    an electronic control device configured and operable such that upon receiving a starting signal from the starter, the control device causes the battery isolator to assume the on position, and thereafter the control device causes the starter motor to start so that the battery isolator is in the on position before the starter motor is started, and
    the control device is configured and operable for switching off the starter motor and to thereafter allow the battery isolator to be switched from on position to off position so that the starter motor is switched off before the battery isolator is caused to assume the off position.

2. The electrical system according to claim 1, wherein the control device receives a starting signal from the starter and the control device is configured to cause the starter motor to start with a time delay after the control device has caused the battery isolator to assume the on position.

3. The electrical system according to claim 1, further comprising:
    an electrical generator,
    the battery isolator is configured and operable in the on position to keep the starting battery set electrically connected to the generator for supply of electric current to the starting battery set from the generator for charging the one or more starting batteries and the isolator in the off position is configured and operable to keep the starting battery set electrically disconnected from the generator, and
    the control device is configured and operable, after the starter motor has been switched off, to cause the battery isolator to assume the off position when the control device has determined or received information that the one or more starting batteries has/have been charged to a given extent.

4. The electrical system according to claim 3, wherein after the starter motor has been switched off, the control device is configured and operable to cause the battery isolator to assume the off position when the one or more starting batteries has/have been charged for a charging time.

5. The electrical system according to claim 3, wherein after the starter motor has been switched off and before the control device has determined, or received information, that the one or more starting batteries has/have been charged to the given extent, the control device is configured and operable to cause the battery isolator to assume the off position when the control device has determined, or received information, that a voltage of the electrical system is lower than a given charge voltage for the one or more starting batteries, and thereafter to cause the battery isolator to assume the on position when the control device has determined, or received information, that the voltage of the electrical system has risen to the given charge voltage.

6. The electrical system according to claim 1, wherein when the battery isolator is in the on position, the isolator is configured and operable to keep the starting battery set electrically connected to the consumer battery set and, when the battery isolator is in the off position, the isolator is configured and operable to keep the starting battery set electrically disconnected from the consumer battery set.

7. A method for control of a starter motor and a battery isolator in an electrical system of a motor vehicle, wherein the electrical system comprises a consumer battery set comprising one or more consumer batteries for supplying electric current to various electrical consumers of the motor vehicle, and a starting battery set comprising one or more starting batteries and connected in parallel with the consumer battery set, the battery isolator being switchable between an off position in which the battery isolator is configured and operable to keep the starting battery set electrically disconnected from the starter motor, and an on position in which the battery isolator is configured and operable to keep the starting battery set electrically connected to the starter motor for supply of electrical current to the starter motor from the starting battery set; the method comprising:
    upon an electronic control device of the motor vehicle receiving a starting signal from a starter, the control device causing the battery isolator to assume the on position, and thereafter the control device causing the starter motor to start so that the battery isolator is in the on position before the starter motor is started, and
    the control device causing the starter motor to be switched off, and thereafter allowing the battery isolator to be switched from on position to off position so that the starter motor is switched off before the battery isolator is caused to assume the off position.

8. A method according to claim 7, wherein upon the control device receiving a starting signal from the starting means, the control device then causing the starter motor to start with a given time delay after the control device has caused the battery isolator to assume the on position.

9. A method according to claim 7, wherein when the battery isolator is in the on position, the isolator keeps the starting battery set electrically connected to a generator of the motor vehicle allowing supply of electric current to the starting battery set from the generator for charging said one or more starting batteries and, when the isolator is in the off position, the isolator keeping the starting battery set electrically disconnected from the generator, after the starter motor has been switched off, and the control device causing the battery isolator to assume the off position when it is determined that the one or more starting batteries has/have been charged to a extent.

10. A method according to claim 9, wherein after the starter motor has been switched off, the control device causing the battery isolator to assume the off position when the one or more starting batteries has/have been charged for a charging time.

11. A method according to claim 9, wherein after the starter motor has been switched off and before it is determined that the one or more starting batteries has/have been charged to a given extent, the control device causing the battery isolator to assume the off position when it is determined that the voltage of the electrical system is lower than a given charge voltage for the one or more starting batteries, and the control device thereafter causing the battery isolator to assume the on position when it is determined that the voltage of the electrical system has risen to the charge voltage.

12. A computer program product comprising computer program codes stored in a non-transitory computer readable medium and executable by a computer in a motor vehicle with an electrical system, which electrical system comprises:
- a consumer battery set comprising one or more consumer batteries for supply of electric current to various electrical consumers of the motor vehicle,
- a starting battery set comprising one or more starting batteries and connected in parallel with the consumer battery set,
- a starter motor for starting the engine,
- a battery isolator switchable between an off position thereof in which the battery isolator keeps the starting battery set electrically disconnected from the starter motor, and an on position thereof in which the battery isolator keeps the starting battery set electrically connected to the starter motor for supply of electrical current to the starter motor from the starting battery set, and
- a starter operable for generating a starting signal for starting the starter motor, causes the computer to cause an electronic control device of the motor vehicle:
- upon receiving a starting signal from the starter, to cause the battery isolator to assume the on position, and thereafter to cause the starter motor to start before the starter motor is started, and
- for switching off of the starter motor, to cause the starter motor to be switched off, and thereafter to allow the battery isolator to be switched from on position to off position such that the starter motor is switched off before the battery isolator is caused to assume the off position.

13. A computer program product according to claim 12, wherein the computer program product comprises a data storage medium which is readable by an electronic control unit, and the computer program codes being stored on the data storage medium.

14. An electronic control unit of a motor vehicle comprising an execution means, a memory connected to the execution means, and a data storage medium connected to the execution means, and the computer program codes of a computer program product according to claim 12 being stored on the data storage medium.

* * * * *

UNITED STATES PATENT AND TRADEMARK OFFICE
CERTIFICATE OF CORRECTION

PATENT NO.       : 8,519,563 B2
APPLICATION NO. : 12/866065
DATED            : August 27, 2013
INVENTOR(S)      : Johan Lindström It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 348 days.

Signed and Sealed this
Fifteenth Day of September, 2015

Michelle K. Lee
*Director of the United States Patent and Trademark Office*